United States Patent [19]
Grimmer

[11] Patent Number: 5,389,317
[45] Date of Patent: Feb. 14, 1995

[54] METHOD FOR MOLDING COMPOSITE ARTICLES INCLUDING A SHAPED FOAM CUSHION BY SPRAYING FOAMABLE COMPONENTS

[75] Inventor: Robert A. Grimmer, Berwick, Me.

[73] Assignee: Davidson Textron Inc., Dover, N.H.

[21] Appl. No.: 108,236

[22] Filed: Aug. 19, 1993

[51] Int. Cl.⁶ .................................. B29C 67/22
[52] U.S. Cl. ...................... 264/46.5; 264/46.6; 264/46.7; 264/309
[58] Field of Search ............ 264/46.4, 46.5, 46.7, 264/309, 46.6

[56] References Cited

U.S. PATENT DOCUMENTS

| | | | |
|---|---|---|---|
| 3,390,214 | 6/1968 | Woods | 26/46.6 |
| 3,555,130 | 1/1971 | Feuer et al. | 264/45 |
| 3,576,930 | 4/1971 | Watters et al. | 264/45 |
| 3,795,722 | 3/1974 | Sassaman | 264/45 |
| 3,872,199 | 3/1975 | Ottinger | 264/46.4 |
| 3,927,162 | 12/1975 | Stalter, Sr. | 264/51 |
| 4,073,839 | 2/1978 | Burkholder et al. | 264/309 |
| 4,077,821 | 3/1978 | Doerfling | 264/46.5 |
| 4,239,564 | 12/1980 | Krumweide | 264/46.7 |
| 4,738,809 | 4/1988 | Storch | 264/46.7 |
| 4,797,320 | 1/1989 | Kopp et al. | 428/316.6 |
| 4,952,358 | 8/1990 | Okina et al. | 264/257 |
| 5,043,114 | 8/1991 | Saito et al. | 264/46.7 |
| 5,069,838 | 12/1991 | Mori et al. | 264/46.7 |

FOREIGN PATENT DOCUMENTS

| | | | |
|---|---|---|---|
| 2342794 | 3/1975 | Germany | 264/46.6 |
| 1110915 | 4/1989 | Japan | 264/309 |

*Primary Examiner*—Allan R. Kuhns
*Attorney, Agent, or Firm*—Reising, Ethington, Barnard, Perry & Milton

[57] ABSTRACT

An automotive interior trim component is constructed by placing a cast polyvinyl chloride (PVC), vacuum formed or sprayed thermoplastic/thermoset cover stock, or a cloth/fabric outer shell in a closeable mold, spraying a coating of urethane foam forming materials onto a back surface of the shell, closing the mold with a lid so that an insert is held in spaced relation to the shell and clamping the lid shut while the foam forming material react to provide a shaped foam cushion that is between and bonded to the shell and the insert.

7 Claims, 1 Drawing Sheet

METHOD FOR MOLDING COMPOSITE ARTICLES INCLUDING A SHAPED FOAM CUSHION BY SPRAYING FOAMABLE COMPONENTS

BACKGROUND OF THE INVENTION

This invention relates to methods for constructing molded composite articles, and more particularly to a method for constructing molded composite articles comprising a shaped foam cushion, such as automotive interior trim components.

Historically poor foam formation in the construction of automotive interior trim components such as instrument pads, door panels, arm rests, glove boxes, center consoles and close out panels has been the foremost cause of scrap and repair related problems in production.

Urethane foam defects of underfills, voids, rattyfoam cell structure, and poor mix is a major manufacturing problem plaguing the entire industry that produce automotive interior trim components, that use a composite construction of a thermoplastic cover, metal or plastic insert and urethane foam to fill the space between the cover and the insert.

In addition to the manufacturing defects, poor urethane foam formation can and does cause field failures of the assembled products. Field failures are exhibited in a number of forms.

"Tiger Striping" that is color changes or staining can be caused by inadequate mixing of the urethane components; isocyanate and polyol.

"Measles" are generally associated with ratty cell formation or small multiple voids which cause an undesired rough irregular surface to the cover.

"Sinks" are another defect caused by large voids in the urethane foam. In this case the void is large enough for the cover stock to sink into the void causing a depression in the cover.

While poor urethane foam quality has been an ongoing problem in the manufacturing plants for years, it has been only in the past few years that major field performance problems have occurred. The reason for the field failures is directly attributable to the increased interior temperatures found in today's aerodynamically designed automobiles.

The increased use of glass and the reduced angle of the windshield has dramatically increased the internal temperatures of the modern automobile. This is commonly referred to today as "the greenhouse effect". Ten years ago the highest test temperature required by one automobile manufacturer for product environmental temperature stability testing was 212° F. Most automotive specifications today require extended exposure to temperatures of 250° F. (121.1° C.).

A good example of the greenhouse effect is found in the results of a test conducted at South Florida Test Services in Miami, Florida in November of 1988. An automotive instrument pad was instrumented with fifteen thermocouple probes to monitor the temperature of various sections of the pad over a twenty-four hour period.

The test fixture was a closed box that positioned the instrument pad under automotive glass at a 45° angle to the sun. At 11:15 in the morning the surface temperature of the pad registered 242° F.

Additional environmental testing supports the Florida study and also indicates that in the peak summer months internal car temperatures can exceed 260° F. These temperatures are sufficient to soften the cover materials so that they conform to the structure of the underlaying urethane foam.

Traditionally a system called "perimeter open pour" has been used to deliver the urethane chemicals to the back side of the cover. The insert is mounted to the lid of a closeable mold or foaming tool. After the mechanically mixed urethane is applied to the back side of the cover, the lid is closed, sealing the mold cavity.

The urethane is applied in a bead strip approximately 2 inches wide around the periphery of the cover. After the mold is closed the urethane has to fill in the space between the cover and the insert. In order to produce a defect free composite article the urethane chemicals must be mixed correctly, chemical temperatures and ratios must be correct, the mold must be at the right temperature, and the mold must be sealed and have a uniform clamping pressure.

Now the urethane has to travel and fill the space between the cover and the insert. The urethane is required to travel up hill, go around corners, go thin and then go thick. In some configurations the urethane has to move laterally as much as 12 to 14 inches. While all this is happening the urethane polymerization reaction is going on to create the cell structure of the foam.

An alternative to the open pour process is the "CMIP" or closed mold injection pour process. The CMIP process injects the urethane into a closed mold through a single entry port. Unfortunately, this process has the same type of problems that open pour has. Additionally, dimensional accuracy of the mold and uniform clamping pressures appear to be even more critical than what is required for the open pour process.

As indicated above, no one has been totally successful in developing the urethane chemistry and tooling to consistently produce a void free urethane foam in automotive interior trim components.

SUMMARY OF THE INVENTION

The object of this invention is to provide a method for constructing molded composite articles, such as automotive interior trim components, comprising a shaped urethane foam cushion in which a void free shaped urethane foam cushion is produced more consistently than in those methods that are now available.

A feature of the method of the invention is that foam forming chemicals are sprayed onto the back of a cover in a mold that is closed so that a shaped foam cushion is formed substantially void free.

Another feature of the method of the invention is that urethane foam forming chemicals are mixed and sprayed onto substantially an entire back of a cover in a mold so that a shaped, substantially void free, urethane foam cushion is formed when the mold is closed.

Yet another feature of the invention is that urethane foam forming chemicals are sprayed substantially uniformly onto a back surface of a shaped polyvinyl shell in a mold that is closed so that a shaped polyurethane cushion is formed that is bonded to substantially the entire back surface of the shell that is exposed within the mold cavity.

Still another feature of the invention is that foam forming chemical are sprayed onto the back of a cover in a mold that is closed so that an insert is held in spaced relationship to the cover and a shaped substantially void free foam cushion is formed between the cover and the insert.

Still yet another feature of the invention is that urethane foam forming chemicals are mixed and sprayed onto substantially an entire back surface of a premolded shaped shell in a mold that is closed and holds an insert spaced from the premolded shell so that a shaped polyurethane cushion is formed that bonds to the shell and the insert and fills the space between them.

BRIEF DESCRIPTION OF THE DRAWINGS

The above and other objects, features and advantages of the invention will become more apparent from the following description taken in conjunction with the accompanying drawings wherein like references refer to like parts and wherein.

DESCRIPTION OF THE INVENTION

Figure 1:
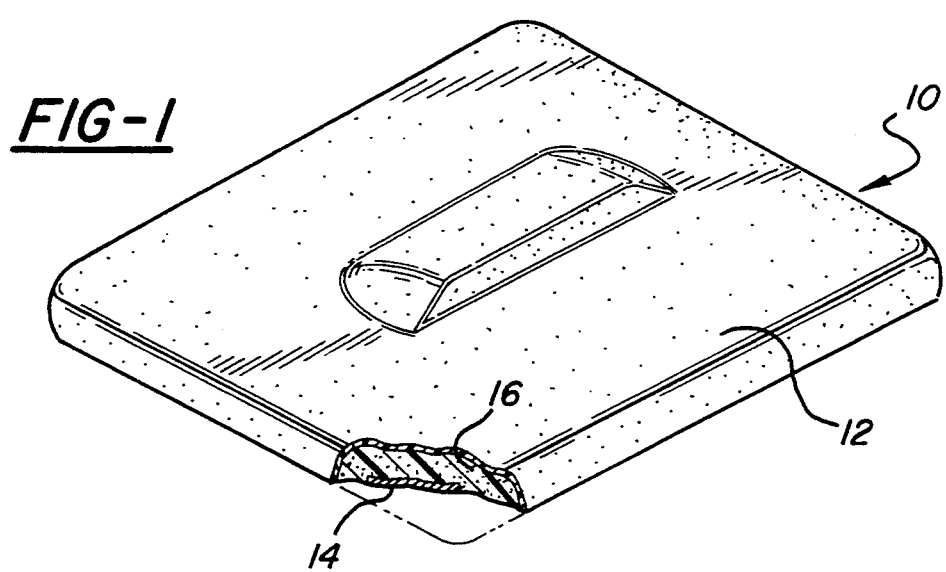
FIG. 1 is a perspective view of an automotive interior trim component of the type that is made in accordance with the method of this invention.

Referring now to the drawing, FIG. 1 illustrates a typical article that can be made in accordance with this invention in the form of an interior trim component 10 for an automobile. The trim component 10 comprises an outer thermoplastic cover 12, a substrate 14 sometimes referred to as an insert, and a shaped foam cushion 16 between the cover 12 and the substrate 14.

The thermoplastic cover 12 can be made of any suitable thermoplastic material that is aesthetically pleasing and feels good to the touch. Typically the thermoplastic cover 12 is a thin shell of polyvinyl chloride (PVC). Other possibilities are thermoplastic urethanes (TPU), thermoplastic polyolefins (TPO)/thermoplastic elastomers (TPE) and polyesters.

The substrate 14 can be made of any suitable structural material that is of sufficient strength for handling and fastening the component 10 to support structure such as an automobile frame or door. The material must also be compatible with the material of the cover 12 and the foam cushion 16. The support or insert 14 can be made of metal or plastic. Typical examples are steel, aluminum, and structural thermoplastics such as polycarbonate, acrylonitrile-butadiene-styrene (ABS) and styrene-maleic anhydride and their associate copolymer blends.

The primary function of the foam cushion 16 is to fill out the cover 12 and give it a soft feel. This invention is particularly well suited to methods of constructing automotive interior trim components that have a polyurethane foam cushion, particularly in combination with a cover in the form of a polyvinyl chloride shell. However, other foam cushions are possible such as those made of polyurea-formaldehyde, polyether and polyisocyanurate foams.

Figure 2:
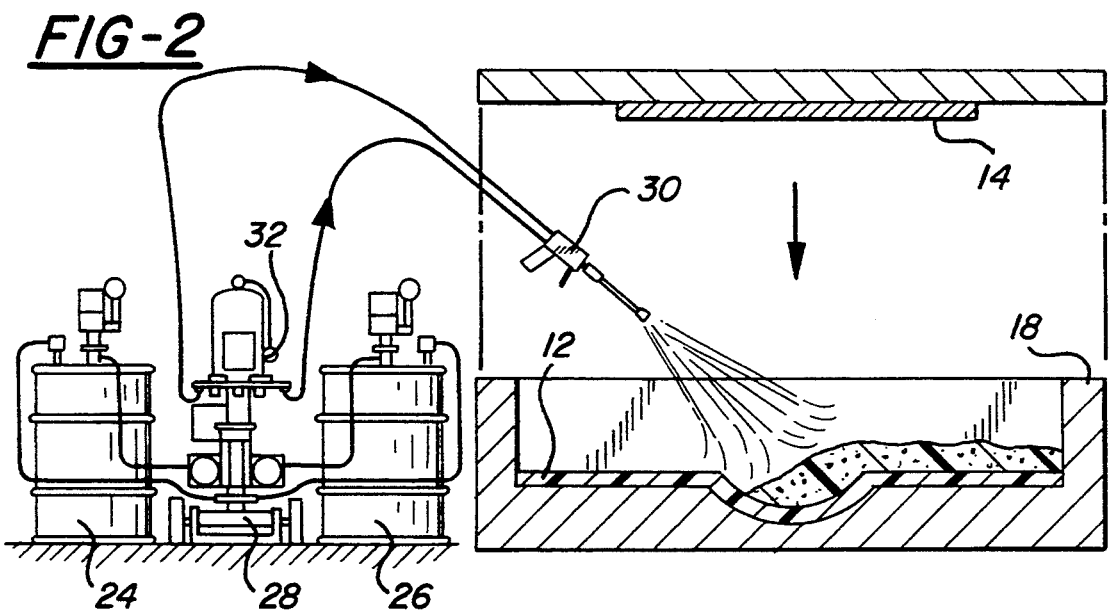
FIG. 2 is a cross section of schematically illustrated apparatus including a closeable mold for practicing the method of this invention.
Figure 3:
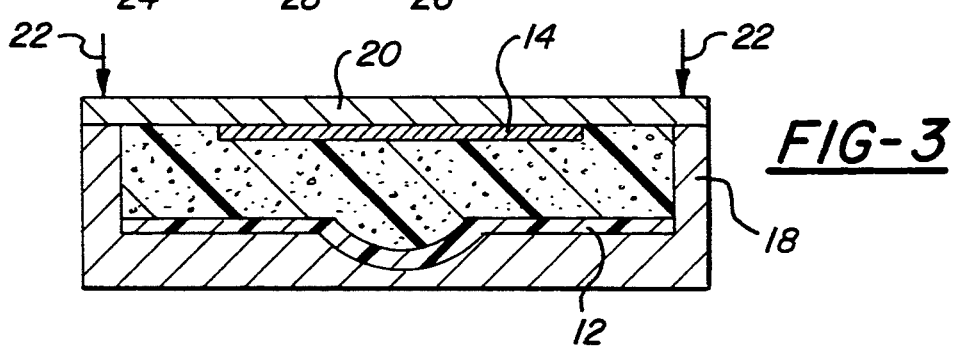
FIG. 3 is a cross section of the closeable mold of FIG. 2 at a later stage in practicing the method of this invention.
Figure 4:
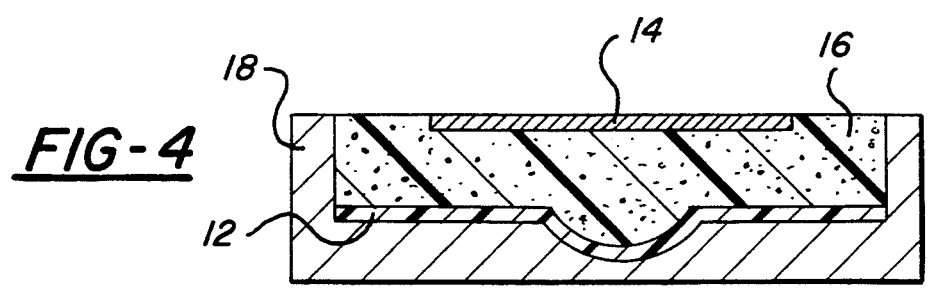
FIG. 4 is a cross section of the closeable mold of FIG. 2 at a still later stage in practicing the method of this invention.

FIGS. 2, 3 and 4 disclose a closeable molding for constructing the interior trim component 10 in accordance with the invention.

Briefly this comprises providing the cover 12, preferably in the form of a premolded, thermoplastic shell of polyvinyl chloride in a mold cavity of a closeable mold 18 as shown in FIG. 2. A coating of urethane foam forming materials is then sprayed onto substantially the entire back surface of the cover 12 in a substantially uniform manner. The mold 18 is then closed by a lid 20 so that the substrate 14 is located in the mold cavity in spaced relationship to the cover 12. The closed mold is clamped shut as indicated by the force arrows 22 in FIG. 3 while the urethane foam forming materials react to fill the space between the cover 12 and the substrate 14 with a polyurethane foam that forms the cushion 16. The polyurethane foam is preferably a semi-rigid type when the chemical reaction is complete. The mold 18 is opened as shown in FIG. 4 and the finished article 10 is removed.

The method uses an impingement mixing spray system to deliver a sprayed coating of urethane chemicals and "paint" the back of the cover 12. By "painting" I mean to uniformly spray a urethane coating onto the back side of the outer cover.

After painting the back of cover 12 with the urethane, the lid 20 of the mold 18 is closed allowing the semi-rigid foam to rise in-place and fill the space between the cover 12 and the substrate 14 which typically averages about half an inch.

This method has a tremendous advantage over the conventional methods described in the introduction because the urethane chemicals are mechanically sprayed to coat the entire back of the cover 12 which eliminates the need for any lateral movement of the foam forming chemicals to fill in the intricacies of the space between the cover 12 and the substrate 14.

Additionally, adhesion of the urethane foam cushion 16 to the thermoplastic cover 12 is improved considerably with the spray application of the urethane components. Conventional manufacturing methods of perimeter open pour and closed mold injection methods require the urethane to flow and fill the space between the cover and the insert. As soon as the urethane is introduced into the mold, the cross linking and foaming action begins. As the reaction and movement of the foam occurs the viscosity of the semi-developed foam increases, thus not "wetting out" the urethane foam and cover uniformly. This problem causes poor or no adhesion of the urethane to the cover stock in some areas of the composite.

Spraying the urethane onto the cover eliminates the wet out problems because the urethane is introduced uniformly to the entire back of the cover at the beginning and wettest point of the reaction profile.

The urethane can be sprayed onto the cover using conventional spray systems that have been developed for spray coating roof insulation and wall insulation. Such a system is schematically illustrated in FIG. 2. Briefly this system comprises respective polyol and isocyanate supplies 24 and 26 connected to a proportioning pump 28 that mixes the components. The mixed components are then delivered to a spray gun 30 along with compressed air from source 32 or an airless delivery system can be used.

EXAMPLE

Semi-rigid urethane foam spray trials were conducted using a two component urethane prepolymer consisting of polyol and isocyanate in a one-to-one ratio. The urethane prepolymer was successfully sprayed onto a PVC shell in a closeable flat plaque mold and mixed to a sufficient degree to produce a free rise foam with a uniform void free cell structure.

A fixed ratio, manual airless spray system was first used to deliver the two component urethane system to the spray gun. The spray gun used 100 mesh filter screens for the plural component urethane system. The spray gun was equipped with a static mixer and a flat tip spray nozzle fitted with an outer air curtain nozzle that helps contain the urethane overspray.

Subsequent process trials have successfully adapted conventional high pressure impingement mixing equipment to be used for the delivery system in place of the fixed ratio manual airless spray system.

Methylene chloride or the ether based recyclable flush systems specifically designed for RIM (Reaction Injection Molding) can be used for flushing and/or cleaning both the airless and high pressure impingement mixing systems.

A high pressure plural component urethane pump system was used for the initial airless spray trials. The two stream urethane system was delivered to the spray gun in equal proportions at 1875 psi.

Both chemical streams were heated to 110° F. and were recirculated from the terminal block at the spray gun back to chemical holding tanks.

The invention has been described in an illustrative manner, and it is to be understood that the terminology which has been used is intended to be in the nature of words of description rather than of limitation.

Obviously, many modifications and variations of the present invention in light of the above teachings may be made. It is, therefore, to be understood that, within the scope of the appended claims, the invention may be practiced otherwise than as specifically described.

The embodiments of the invention in which an exclusive property or privilege is claimed are defined as follows:

1. A method of constructing a molded composite article having a foam cushion that is attached to a cover comprising the steps of:
   providing a closeable mold that has a mold cavity,
   providing a removable cover having a face disposed on a surface of the mold cavity and an exposed back surface,
   spraying a coating of foam forming materials onto substantially the entire back surface of the cover in a substantially uniform manner while the mold is open, and
   closing the mold with a lid so as to hold a substrate in spaced relationship to the cover while the foam forming materials react to fill the space between the cover and the substrate with a foam to provide a foam cushion between the cover and the substrate.

2. The method as defined in claim 1 wherein the cover is provided in the form of a premolded thermoplastic shell of polyvinyl chloride.

3. The method as defined in claim 1 wherein urethane foam forming materials are sprayed onto the back of the cover that react to fill the space between the cover and the substrate with a semi-rigid polyurethane foam.

4. A method of constructing a molded plastic composite article having a foam cushion that is disposed between and bonded to a cover and an insert comprising the steps of:
   placing the cover in the form of a thermoplastic shell in a mold cavity of a closeable mold so that it has an exposed back surface,
   spraying a coating of urethane foam forming materials onto substantially the entire back surface of the shell substantially uniformly while the mold is open, and
   closing the mold with a lid that holds the insert in spaced relationship to the shell while the urethane foam forming materials react to fill the space between the shell and the insert with a polyurethane foam to provide a foam cushion between the shell and the insert.

5. The method as defined in claim 4 wherein the shell is made of polyvinyl chloride.

6. The method as defined in claim 4 wherein the urethane foam forming materials that are sprayed onto the back of the shell react to fill the space between the shell and the insert with a semi-rigid polyurethane foam.

7. A method of constructing a molded plastic composite article having a foam cushion that is disposed between and bonded to a cover and a substrate comprising the steps of:
   placing the cover in the form of a polyvinyl chloride thermoplastic shell in a mold cavity of a closeable mold so that it has an exposed back surface,
   spraying a coating of urethane foam forming materials onto substantially the entire back surface of the shell in a substantially uniform manner,
   closing the mold with a lid and holding the substrate in spaced relationship to the thermoplastic shell in the closed mold, and
   clamping the lid in a closed position while the urethane foam forming materials react to fill the space between the shell and the substrate with a polyurethane foam to provide a foam cushion that is disposed between and bonded to the shell and the substrate.

* * * * *